(No Model.)

D. M. OSBORNE, Dec'd.

E. W. OSBORNE, Executrix, and F. HARRIS and T. M. OSBORNE, Executors.

CUTTING APPARATUS FOR GRAIN HARVESTING MACHINES.

No. 358,216.           Patented Feb. 22, 1887.

WITNESSES           INVENTOR

Sidney P. Hollingsworth      D. M. Osborne.
Harry Shipley          By. Philip T. Dodge,
                                       Attorney

UNITED STATES PATENT OFFICE.

DAVID M. OSBORNE, OF AUBURN, NEW YORK; ELIZA W. OSBORNE EXECUTRIX, AND FREDERICK HARRIS AND THOMAS M. OSBORNE EXECUTORS, OF SAID DAVID M. OSBORNE, DECEASED.

CUTTING APPARATUS FOR GRAIN-HARVESTING MACHINES.

SPECIFICATION forming part of Letters Patent No. 358,216, dated February 22, 1887.

Application filed October 29, 1884. Renewed March 18, 1886. Serial No. 195,754. (No model.)

*To all whom it may concern:*

Be it known that I, DAVID M. OSBORNE, of Auburn, in the county of Cayuga and State of New York, have invented certain Improvements in Cutting Apparatus for Grain-Harvesting Machines, of which the following is a specification.

The chief aims of this invention are to permit the cutters to be lowered and safely operated close to the surface of the ground, and to protect the under side of the platform, when lowered with the cutter, from wear or injury in the event of contact with the surface or with stones or other obstructions thereon.

To this end it consists in a finger-bar of an angular form having flanges extended forward and backward from its upper and lower edges, respectively, in combination with guard-fingers attached to the upper flange, and a platform-bottom connected to the lower flange by a covering-plate, as hereinafter more fully set forth.

Figure 1:
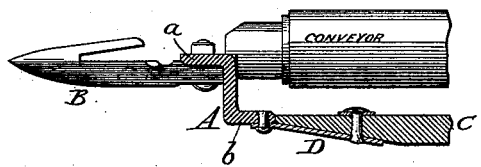
Figure 2:
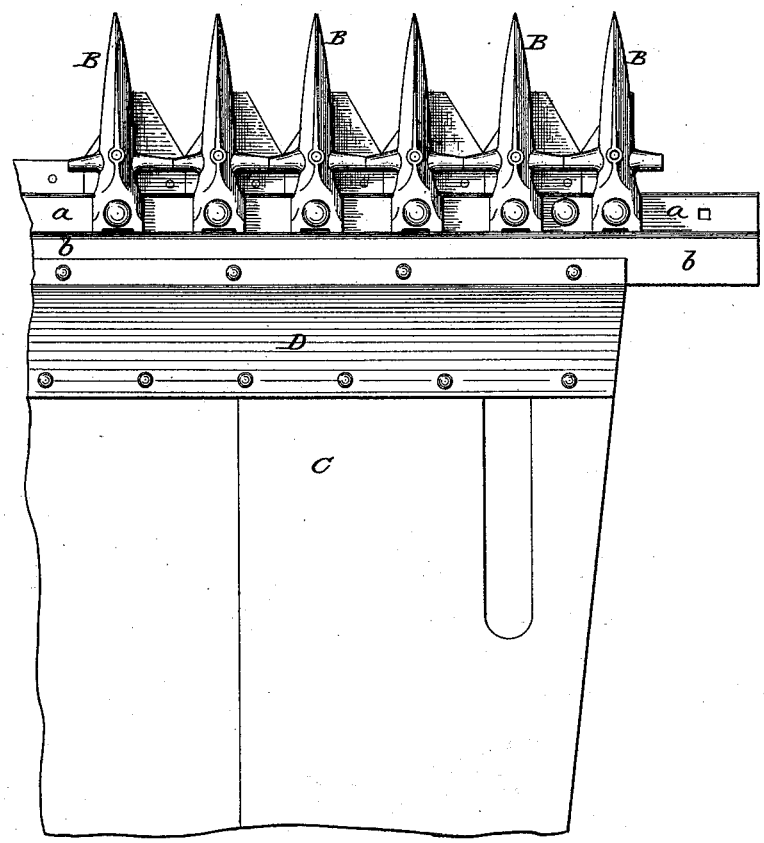

Referring to the accompanying drawings, Figure 1 represents a vertical cross-section through the center bar and the parts united thereto. Fig. 2 is a bottom plan view of the same parts together with the sickle.

Referring to the drawings, A represents the finger-bar, consisting of a single bar of angle-iron having an upright web or body, commonly of a height of two inches or thereabout, with a flange, *a*, extending forward from the upper edge, and a like flange, *b*, extended backward from the lower edge.

B B represent the guard-fingers, which may be of any ordinary or suitable construction, bolted at their heel ends to the upper flange, *a*.

C represents the bottom or sheathing on the under side of the harvester-platform or platform-frame, which latter may be constructed as usual, its office being to completely close the under side of the frame to prevent the entrance of grain and other obstructive matters, and to protect the endless apron or other conveying mechanism from contact with the surface of the ground. This bottom, instead of being secured to the upper or under side of the finger-bar in the customary manner, is now butted endwise against the lower flange, *b*, flush therewith on the under side, and secured thereto by a thin metal covering and splicing-plate, D, which is extended the entire length of the cutter-bar and bottom, and riveted or otherwise firmly secured to the two parts. Inasmuch as the platform is usually inclined downward toward the front when in action, the bottom C may be chamfered or beveled on the under side, as shown, thus allowing the bottom to be placed lower than otherwise, giving increased depth within the platform-frame and permitting the conveying-aprons or their substitutes to be lowered more nearly to the level of the cutters. This beveling of the bottom is not, however, a necessary feature of my construction.

When the parts are constructed as above described, I am enabled to cut grain nearer the surface of the ground than by machines of the usual construction, and this without having the bottom of the platform slide upon or encounter the ground. This advantage is due to the fact that the bottom of the platform is raised more nearly to the level of the cutter than usual, and so protected by the plate that it will not be injured by accidentally encountering obstructions.

The attachment of the fingers to the upper forward flange of the bar is peculiarly advantageous in connection with the attachment of the platform-bottom, as described, to the lower flange, inasmuch as the rear ends of the fingers are sustained above the level of the guard-plate D, and thus prevented from coming in contact with the ground, while at the same time their position is such that when the platform is tilted forward their points may travel close to the surface of the ground. The relative position of the parts is such that the guard-plate will in every instance ride upon the surface of the ground and support the platform before the guard-fingers or the cutter-bar can meet the surface.

I am aware that it has been proposed to construct heading-machines which act upon the grain near its head, and never operate with the cutters near the ground, with a finger-bar of peculiar angular section united by metal straps to an open frame; but I believe myself to be the first to combine a finger-bar having upper and lower flanges, as shown, with guard-fingers attached to the upper flange, and a platform-bottom attached to the lower flange by an underlying plate.

What I claim as my invention is—

1. As an improvement in harvesting-machines designed to cut near the surface of the ground, the metal finger-bar having the front flange at its top and the rear flange at its bottom, in combination with the guard-fingers attached to the top flange, the platform-bottom seated against the edge of the lower flange, and the continuous splicing and protecting-plate secured to the under side of the bottom and the flange, as shown, whereby the machine is enabled to cut near the surface and the parts protected from wear and injury.

2. In a grain-harvesting machine, the metal finger-bar having the top flange at its front and the bottom flange at its rear, in combination with the guard-fingers secured to the top flange, the platform-bottom chamfered at its forward edge and butted against the edge of the lower flange, and the underlying guard-plate overlying the bottom and the lower flange substantially their entire length and secured thereto, as shown.

DAVID M. OSBORNE.

Witnesses:
C. F. BALDWIN,
F. H. KEYES.